United States Patent [19]
Cogliano

[11] 3,913,298
[45] Oct. 21, 1975

[54] METHOD OF PACKAGING
[75] Inventor: Joseph A. Cogliano, Baltimore, Md.
[73] Assignee: W. R. Grace & Co., New York, N.Y.
[22] Filed: Oct. 24, 1973
[21] Appl. No.: 409,351

Related U.S. Application Data
[63] Continuation-in-part of Ser. No. 267,720, June 29, 1972, abandoned.

[52] U.S. Cl. .................. 53/36; 427/222; 427/341; 53/36
[51] Int. Cl.$^2$ .......................... B65B 33/00
[58] Field of Search ........ 117/100 C, 62; 260/2.5 B, 260/2.5 BE, 2.5 AK; 53/36, 3; 427/222, 341

[56] References Cited
UNITED STATES PATENTS

| | | | |
|---|---|---|---|
| 2,653,139 | 9/1953 | Sterling | 53/36 X |
| 2,779,062 | 1/1957 | Stastny | 260/2.5 B |
| 2,780,350 | 2/1957 | Simon et al. | 53/36 X |
| 2,797,201 | 6/1951 | Veatch et al. | 260/2.5 B |
| 2,981,984 | 5/1961 | Orr | 53/36 UX |
| 3,032,524 | 5/1962 | Brewer | 260/DIG. 22 |
| 3,204,385 | 7/1965 | Remer et al. | 56/36 |
| 3,222,843 | 12/1965 | Schneider | 53/36 |
| 3,251,916 | 5/1966 | Newnham et al. | 260/2.5 B |
| 3,277,026 | 10/1966 | Newnham et al. | 260/2.5 B |
| 3,419,134 | 12/1968 | Fihs | 53/36 X |
| 3,618,287 | 11/1971 | Gobhai et al. | 53/36 |
| 3,830,895 | 8/1974 | Theodorsen | 53/36 |
| 3,871,521 | 3/1975 | Szatkowski | 53/36 |

*Primary Examiner*—William D. Martin
*Assistant Examiner*—Janyce A. Bell
*Attorney, Agent, or Firm*—Richard P. Plunkett; Kenneth E. Prince

[57] ABSTRACT

This invention relates to a packaging material and method whereby an article is encased in a non-porous foamed material, e.g. expanded polystyrene beads, coated with a latex, the coagulation of said latex under ambient conditions, e.g. 22°C at atmospheric pressure, with a gaseous coagulant forming a substantially unified, lightweight, rigid, cushioned packaging material encasing said article.

9 Claims, No Drawings

METHOD OF PACKAGING

This application is a continuation-in-part of copending application having Ser. No. 267,720, filed 6/29/72, now abandoned.

This invention relates to a packaging material. More particularly this invention relates to a lightweight, integral packaging material which is formed in situ around the packaged article.

The packaging of irregularly shaped articles has caused wide concern in the packaging art. Depending on size many irregularly shaped articles require wooden crates with packing therein to protect them during shipment. More recently the packaging field has turned to plastics particularly blown plastics, e.g. foamed polystyrene as a packaging material. The use of expandable polystyrene beads to form molded containers has caught on appreciably in the packaging field. However such containers are only employed when the article is shipped in high volume. When production volumes are too low to justify the expense of a mold, fabricated foamed polystyrene parts frequently are used. Foamed polystyrene parts may be fabricated from either molded bead board or extruded log using conventional woodworking equipment and hand tools. Although fabrications eliminates mold cost, high labor cost, and scrap losses are drawbacks the packager must contend with.

One object of the instant invention is to produce a packaging material which will form a substantially unified, rigid, cushioning structure around an article in situ. Another object of the instant invention is to produce a packaging material which can package and protect irregularly shaped articles as well as regularly shaped articles. Another object of the instant invention is to produce a lightweight rigid packaging material. A still further object of the instant invention is to produce a method of forming a lightweight rigid packaging material which will readily protect any shaped article. Another object of the instant invention is to produce a packaging material which will conform to odd shapes, will not settle and will impart high impact strength to the package.

The above and other objects, which will become apparent from a reading hereinafter, are obtained by encasing the article to be packaged in a non-porous foamed material, said material being coated with a latex and thereafter adding a gaseous coagulant for said latex thereby forming a substantially unified, integral, rigid, cushioned packaging material encasing said article.

In practicing the instant invention, expanded nonporous polystyrene beads or other shapes, e.g. spaghetti are coated with a layer of neoprene, natural rubber or other latex to give a mixture which can easily be deformed prior to coagulation. The thus coated polystyrene is placed in a corrogated box or other container and the object to be protected is embedded in the coated expanded polystyrene. Additional coated polystyrene is added over the article and thereafter a gaseous coagulant, e.g. carbon dioxide is added to gel the latex thus causing the polystyrene beads to adhere to each other thereby producing a unified, rigidized structure.

The coating of the beads can be done in various conventional ways. For example the beads can be charged to a rotating hopper along with sufficient latex to coat the beads. Since the beads are non-porous, this system is economical since it is not necessary to fill up the pores of the beads with latex before a coating on the beads, sufficient to form a rigidized structure, is obtained.

The amount of latex added to the beads is dependent upon bead diameter. That is the smaller the bead diameter the more latex is necessary due to the greater surface area of the beads. Ordinarily amounts from 1 to 5 parts of latex to one part of beads by weight, preferably 1 to 3 parts of latex to one part of beads by weight is employed to coat the expanded polystyrene. Excess latex is to be avoided since it merely drips off the beads forming highly concentrated areas of latex in the container.

The latexes employed in the instant invention are those well known latexes which can be coagulated by a gaseous coagulant. Anionic neoprene latex is preferred but other latexes are operable. Such latexes include but are not limited to cationic neoprene, natural rubber, synthetic rubber, and the like. In the event that the latex is in a highly stabilized condition it is possible to add well known commercially available reactants thereto to bring it to a point of incipient gelation prior to coating the non-porous material.

Various gaseous coagulants can be employed herein to coagulate the latex. Preferred gaseous coagulants are those which are non-corrosive, non-toxic and non-irritating such as carbon dioxide. However other gaseous coagulants such as $SO_2$, $SO_3$, $NO$, $NO_2$, formic, acetic, propionic, or halogenated acids can also be employed.

The coagulation step herein is carried out under ambient conditions, i.e. 60°–110°F., at atmospheric pressure. Ordinarily, the coagulation step is performed at room temperature, about 70°–75°F., at atmospheric pressure.

Another embodiment of the instant invention as a packaging material is the use of the latex-coated, expanded polystyrene beads in a plastic bag having sufficient porosity to pass a gas but not the coated beads. Bags of the latex-coated, expanded polystyrene can be packed around the article to be packaged while the bags are in a deformable configuration and thereafter the latex can be coagulated by adding a gaseous coagulant such as $CO_2$ to each of the bags thereby rigidizing the packaged structure. Such a system allows the article to be packaged to avoid any contamination or corrosion which might result from the coagulating reaction. Another method of avoiding any contamination or corrosion is to merely package the article in a non-porous plastic container and thereafter add the latex coated polystyrene beads to encase the packaged article followed by coagulating the latex to form a rigidized structure around the plastic coated article.

The non-porous foamed material employed herein is preferably expanded polystyrene due to its economics, availability and light weight. The expanded polystyrene usually has a density in the range of about 0.1 to 7 pounds per cubic foot.

In practicing the instant invention it is desirable to know when coagulation is complete. Aside from merely feeling the rigid structure, another method which can be employed is the inclusion of a pH indicator in the system. Such indicators are well known and available commercially.

The following examples are set forth to explain but expressly not limit the instant invention. Unless otherwise noted, all parts and percentages are by weight. Additionally unless otherwise noted, all examples herein were carried out under ambient conditions.

EXAMPLE 1

172.4 grams of expanded polystyrene foamed beads having a average density of 2 pounds per cubic foot were coated with 344.8 grams of an anionic neoprene latex "L-572" (50 percent solids) commercially available from E. I. Dupont by admixing the beads and the latex in a plastic bag manually until the coating was uniform. After mixing, a portion of the mixture was placed in a plastic lined cardboard box. A wall clock was placed in the box and covered with the additional portion of the coated expanded polystyrene beads. Carbon dioxide was charged to the box in an amount sufficient to coagulate the latex. After 5 minutes the latex coagulated thereby forming a lightweight, rigidized, unified structure of the beads around the clock in the box.

EXAMPLE 2

Example 1 was repeated except that .001 grams of methyl red was added to the latex before admixture with the expanded polystyrene beads. On completion of the coagulation, the rigidized unified packaging material had a cream color.

EXAMPLE 3

2 parts by weight of neoprene latex "L-572" was mixed with 1 part by weight of expanded polystyrene foamed beads and charged to several multiperforated plastic bags. Perforations in the bags were of such size as to allow the passage of a gas but not large enough to pass the expanded polystyrene beads. Two of the bags were placed on the bottom of a plastic container and two soda pop bottles were recessed in the deformable bags. An additional 2 bags were placed over the bottles and carbon dioxide was added to each of the bags. After 5 minutes coagulation occured in each bag forming a unified, rigid, lightweight structure in each bag. The bags were readily removed and each showed a recessed area in the shape of the bottle. Such packaging material could be used repeatedly for the same shape bottle.

EXAMPLE 4

2 parts by weight of anionic neoprene latex "L-572" was admixed with 1 part by weight of expanded foamed polystyrene beads until a uniform coating was formed on the beads. ½ of the mixture was charged to a cardboard box. Metal electrical components loosely packed in an impermeable polyethylene bag were embedded in the beads and covered with the remainder of the coated polystyrene beads. Carbon dioxide was added to the box and within 5 minutes the latex coagulated thus forming a substantially unified rigid packaging structure around the electrical components.

The rigid package structure obtained by the practice of the instant invention can be readily removed from the packaged article by adding a debonding agent to the latex prior to coagulation.

The debonding agent and the latex material (neoprene, for example) or the debonding agent and the surface of the article to be packaged must be incompatible. Hildebrand has shown why some pairs of materials mix more readily than others. He utilizes the concept of the solubility parameter "δ" which he defined as $$\delta = (\Delta E/V)^{1/2}$$

where
$\Delta E$ = the energy of vaporization
$V$ = the molar volume.

If the solubility parameters are alike, the materials tend to form a solution. The greater the difference, however, between the solubility parameters the more immiscible the materials become. See Skeist "Handbook of Adhesives" Reinhold Publishing Corp., 1966, pages 10 and 11. Thus in the instant invention it is necessary that the debonding agent has a solubility parameter at least $2(cal/cc)^{1/2}$ higher than the latex polymer to decrease adhesion and allow stripping.

The amount of the debonding agent added to the composition can be varied between about 0.1 to 20 percent by weight of the polymer in the latex. Greater amounts can be added but strippability is not appreciably improved.

The following example shows the use of a debonding agent in the instant invention.

EXAMPLE 5

172.4 grams of expanded polystyrene foamed beads having a average density of 2 pounds per cubic foot were coated with 344.8 grams of an anionic neoprene latex "L-572" (50 percent solids) commercially available from E. I. Dupont, said latex containing 17 grams of glycerine, by admixing the beads and the latex in a plastic bag manually until the coating was uniform. After mixing, a portion of the mixture was placed in a plastic lined cardboard box. A wall clock was placed in the box and covered with the additional portion of the coated expanded polystyrene beads. Carbon dioxide was charged to the box in an amount sufficient to coagulate the latex. After 5 minutes the latex coagulated thereby forming a lightweight, rigidized, unified structure of the beads around the clock in the box. After 24 hours the rigidized structure of the beads was readily stripped from around the clock.

What is claimed is:

1. A process for packaging an article which comprises embedding the article to be packaged in discrete particles of non-porous foamed polystyrene, said particles being coated with a latex selected from the group consisting of natural and synthetic rubbers and thereafter at ambient conditions coagulating said latex by contact with a gaseous coagulant selected from the group consisting of carbon dioxide, $SO_2$, $SO_3$, NO and $NO_2$ thus forming a lightweight, unified, rigid packaging material encasing said article.

2. The process according to claim 1 wherein the latex is neoprene and the gaseous coagulant is carbon dioxide.

3. The process according to claim 1 wherein the latex contains 0.1 to 20 percent by weight of the polymer in the latex of a debonding agent.

4. The process according to claim 3 wherein the debonding agent is glycerine.

5. The process according to claim 1 wherein the article is prepackaged in an impermeable plastic container prior to being embedded in the coated particles.

6. The process according to claim 1 wherein the latex is admixed with a pH indicator prior to coating the non-porous foamed polystyrene.

7. The process of packaging an article which comprises embedding said article in discrete particles of non-porous foamed polystyrene coated with a latex selected from the group consisting of natural and synthetic rubber, said coated particles being contained in a deformable porous plastic container and at ambient conditions and thereafter adding a gaseous coagulant selected from the group consisting of carbon dioxide, $SO_2$, $SO_3$, NO and $NO_2$ to the latex coating to coagulate the latex thereby forming a lightweight, unified, rigidized packaging material.

8. The process according to claim 7 wherein the latex is neoprene and the gaseous coagulant is carbon dioxide.

9. The process according to claim 7 wherein the latex is admixed with a pH indicator prior to coating the non-porous foamed polystyrene.

* * * * *